United States Patent [19]
Yamamoto et al.

[11] Patent Number: 6,127,044
[45] Date of Patent: Oct. 3, 2000

[54] METHOD FOR PRODUCING TITANIUM ALLOY TURBINE BLADES AND TITANIUM ALLOY TURBINE BLADES

[75] Inventors: Masaru Yamamoto; Hironobu Yamamoto, both of Yokohama, Japan; Herbert Puschnik; Manfred Koren, both of Kapfenberg, Austria

[73] Assignees: Kabushiki Kaisha Toshiba, Kawasaki, Japan; Boehler Schmiedetechnik Gesellschaft mit beschrankter Haftung & Company Kommandit Gesellschaft, Kapfenberg, Austria

[21] Appl. No.: 09/043,025

[22] PCT Filed: Sep. 13, 1995

[86] PCT No.: PCT/JP95/01817

§ 371 Date: Jun. 2, 1998

§ 102(e) Date: Jun. 2, 1998

[87] PCT Pub. No.: WO97/10066

PCT Pub. Date: Mar. 20, 1997

[51] Int. Cl.$^7$ .............................. B32B 15/01; C22F 1/18; F01D 5/28
[52] U.S. Cl. ...................... 428/603; 148/669; 148/670; 148/671; 148/902; 416/241 R; 428/610; 428/636; 428/660
[58] Field of Search .................................... 428/603, 610, 428/636, 660; 416/241 R; 148/669, 670, 671, 407, 421, 902

[56] References Cited

U.S. PATENT DOCUMENTS 5,299,353 4/1994 Nazmy et al. ............... 416/241 R
5,366,345 11/1994 Gerdes et al. ................. 416/241 R
5,795,413 8/1998 Gorman ........................... 148/671

FOREIGN PATENT DOCUMENTS

| | | |
|---|---|---|
| 0487803A1 | 6/1992 | European Pat. Off. . |
| 55-27813 | 7/1980 | Japan . |
| 63-302102 | 12/1988 | Japan . |
| 1-202389 | 8/1989 | Japan . |
| 4-289154 | 10/1992 | Japan . |
| 5-263604 | 10/1993 | Japan . |
| 6-235301 | 8/1994 | Japan . |
| 837636 | 6/1960 | United Kingdom . |
| WO94/14995 | 7/1994 | WIPO . |

*Primary Examiner*—Deborah Jones
*Assistant Examiner*—Robert R. Koehler
*Attorney, Agent, or Firm*—Finnegan, Henderson, Farabow, Garrett & Dunner, L.L.P.

[57] ABSTRACT

A method for producing titanium alloy turbine blades comprising the steps of (a) forming turbine blades of titanium alloy through hot forging or machining, (b) cooling leading edges on tip portions of the turbine blades including covers thereof formed through hot forging or machining faster than blade main body after final hot forging or solid solution treatment, and (c) heat treating the cooled turbine blades. With this method, it is possible to manufacture titanium turbine blades in an economical fashion and obtain titanium alloy turbine blades superior in reliability by preventing erosion.

15 Claims, 3 Drawing Sheets

METHOD FOR PRODUCING TITANIUM ALLOY TURBINE BLADES AND TITANIUM ALLOY TURBINE BLADES

TECHNICAL FIELD

This invention relates to a method for producing titanium alloy turbine blades which can be used for steam turbines, gas turbines, aircraft engines and others, and particularly to a method which can economically produce highly reliable titanium alloy turbine blades which can prevent erosion from water droplets, sand or the like. Further, this invention relates to such titanium alloy turbine blades themselves.

BACKGROUND ART

A titanium alloy has such a small specific gravity and remarkable corrosion resistance that it is used for blades at the last stage or low-temperature stages of a low-pressure turbine among steam turbines, and for blades at preceding and low-temperature stages of a compressor in gas turbines or aircraft engines. Under the above application circumstances, the low-pressure turbine among the steam turbines is exposed to a high-speed collision of wet steam, causing erosion (water droplet erosion) and abrasion of the turbine blades due to the water droplets contained therein. And, suction of a large volume of air by the compressor in the gas turbines and the aircraft engines causes sand or dust included in the air to hit the turbine blades to wear away or erode (sand erosion) the turbine blades.

Damages due to the erosion will be described with reference to FIG. 1, FIG. 2 and FIG. 3. FIG. 1 is a perspective view showing one example of the shape of turbine blades for a steam turbine, and FIG. 2 is a perspective view showing one example of the shape of turbine blades for an aircraft engine, and FIG. 3 is a presentative view showing one example of turbine blades having cover and snubber. FIG. 1 to FIG. 3 show that erosion is caused concentrated on the leading edges rotating at a high speed on the tip portions when blades 1 rotate. Eroded portions 2 are indicated by mark X. Reference numeral 3, 4a, and 4b indicate a turbine rotor, covers, and snubber portion, respectively.

Conventional methods to prevent such erosion include to weld or braze a hard material such as a Co-based alloy, such as stellite (trademark of Cabot Corp), or a Ti-15Mo-5Zr-3Al alloy excellent in erosion resistance to the leading edges on the tip portions of the blades which tend to be eroded, or coat them with ceramics or the like.

But, the junction or coating of the above special materials has disadvantages that the welded or brazed section or the coating interface includes the connection of different materials and heat affected zones, causing a high residual stress and an embrittlement phase, as well as a large distortion, so that strength is lowered and a long-term reliability is inferior.

To remedy the above disadvantages, the present invention has been completed and aims to provide a method for producing titanium alloy turbine blades which can be produced economically, can prevent erosion from occurring, and is superior in reliability.

The present invention further aims to provide titanium alloy turbine blades excellent in erosion resistance at the leading edges of the tip portions of the blades including covers and in reliability.

DISCLOSURE OF INVENTION

A first production method of this invention is characterized by a step of forming titanium alloy turbine blades by hot forging, a step of cooling the leading edges including cover on the tip portions of the turbine blades formed by the hot forging faster than the blade bodies, and a step of heat treating the cooled turbine blades.

In this invention, the leading edges including cover on the tip portions of the blades indicate portions where erosion is concentratedly caused on the turbine blades including the snubbers. The covers and snubbers are, respectively, protrusions or bumps which are disposed at the leading edges or middle of the blade effective portions and fix the blades or suppress vibration thereof by contacting adjacent blades. In FIG. 1, FIG. 2 and FIG. 3, for example, such erosion caused sections 2 are indicated by marks X. Referring to FIG. 1 and FIG. 3, description will be made specifically. The leading edge including cover on the tip portion indicates an area within ½ of the blade width W seen from a steam-hitting direction in FIG. 1 and FIG. 3. A preferable area is within ⅓ of the blade width W seen from the steam-hitting direction in order to further improve the erosion resistance according to the invention. The tip portions of the blade indicates an area within ½ of an effective length L of the blade from its tip end in FIG. 1. The blade body indicates the area excluding the leading edge including cover on the tip portion of the blade.

The step for forming the turbine blades of this invention by hot forging includes not only hot closed die forging but also the hot closed die forging and a coining process to be effected thereafter as required.

The step for heat treating the cooled turbine blades according to this invention is a step for annealing or aging the blades.

In a case of $\alpha+\beta$ type titanium alloy turbine blades, the hot forging is effected at an $\alpha+\beta$ temperature range 10° C. or more lower than $\beta$ transus temperature, the leading edges including cover on the tip portions of the blades are cooled faster than the blade bodies, and the blades are heat-treated for annealing or aging at a temperature range of from 450° C. to 850° C. As schematically shown in FIG. 4, the specific examples of the heat treatment comprise at least one heat treatment step selected from a group of a step for heat treating continuously at one temperature for a suitable period (FIG. 4(a)), a step for heat treating continuously with a suitable temperature gradient for a suitable period (FIG. 4(b)), a step for heat treating continuously for a suitable period by combining a plurality of temperatures and a plurality of holding times (FIG. 4(c)), and a step for heat treating intermittently repeating several times one of above described three steps (FIG. 4(d)). In FIG. 4, intervals between dotted lines show suitable heating period.

More specifically, for the $\alpha+\beta$ type titanium alloys, the forging temperatures are preferably below 930° or below 970° C. which is 10° C. or more lower than the respective $\beta$ transus temperature of the $\alpha+\beta$ titanium alloy. In order to cool it after the forging, the blade bodies are radiationally cooled, the leading edges including cover on the tip portions are quenched by at least one method selected from gas cooling including air by forced-FAN or pressurized, liquid cooling including water or oil or media which quench rates are between those of water and those of oil, and forced cooling by a mixture between liquid and gas which become spray like or foggy under pressure so as to be cooled faster than the blade bodies. Thereafter, the blades are then heated for the suitable time intervals at anyone temperature condition selected from the following group of (a) keeping and heating at the temperature of 750° C. to 850° C. directly followed by a step of heating and keeping at 450 to 720° C., (b) keeping and heating at 750 to 850° C. directly followed by intermittent keeping and heating at 450 to 720° C., (c) keeping and heating at temperature of 450 to 600° C. directly followed by continuous keeping and heating at 625 to 720° C., (d) keeping and heating at 450 to 600° C. directly followed by intermittent keeping and heating at 625 to 720° C., or (e) keeping and heating at 450 to 720° C. As an oil for forced cooling purpose, a refrigerant such as a mineral oil can be cited. As liquid which cooling rates for cooling titanium alloy are between water cooling and oil cooling, a mixture of refrigerant and water or a suspension of mineral oil can be cited in water.

The α+β titanium alloy includes a Ti-6Al-4V alloy (titanium alloy containing 6 wt. % of aluminum and 4 wt. % of vanadium), a Ti-6Al-2Sn-4Zr-2Mo-0.1Si alloy (titanium alloy containing 6 wt. % of aluminum, 2 wt. % of tin, 4 wt. % of zirconium, 2 wt. % of molybdenum and 0.1 wt. % of silicon), a Ti-6Al-6V-2Sn alloy (titanium alloy containing 6 wt. % of aluminum, 6 wt. % of vanadium and 2 wt. % of tin) and others.

And, in a case of turbine blades made of a near β titanium alloy such as a Ti-10V-2Fe-3Al alloy (titanium alloy containing 10 wt. % of vanadium, 2 wt. % of iron, and 3 wt. % of aluminum), a Ti-5Al-4Cr-4Mo-2Sn-2Zr alloy (titanium alloy containing 5 wt. % of aluminum, 4 wt. % of chromium, 4 wt. % of molybdenum, 2 wt. % of tin and 2 wt. % of zirconium) and a Ti-5Al-2Sn-4Zr-4Mo-2Cr-1Fe alloy (titanium alloy containing 5wt. % of aluminum, 2 wt. % of tin, 4 wt. %; of zirconium, 4 wt. % of molybdenum, 2 wt. % of chromium and 1 wt. % of iron), after the hot forging while heating at 730 to 875° C. which is 10° C. or more lower than the respective beta transus temperature of the near beta titanium alloy, in the cooling step, the blade bodies are radiationally cooled, the leading edges including cover on the tip portion of the blades are quenched by at least one method selected from gas cooling including air by forced-FAN or pressurized, liquid cooling including water or oil or media with quench rates between of those of water and those of oil, and liquid spraying by a mixture of a pressurized liquid and gas so as to be cooled faster than the blade bodies, then the blades are heated for aging at 420 to 650° C. or a plurality of temperatures. The hot forging and aging treatment temperatures have a preferable range depending on the composition of the near β titanium alloy. For example, the above alloy compositions preferably have the hot forging temperature and the aging treatment temperature set at 760 to 850° C. and 500 to 650° C., respectively.

For β titanium alloys such as a Ti-15V-3Cr-3Al-3Sn alloy (titanium alloy containing 15 wt. % of vanadium, 3 wt. % of chromium, 3 wt. % of aluminum and 3 wt. % of tin), a Ti-3Al-8V-6Cr-4Mo-4Zr alloy (titanium alloy containing 3 wt. % of aluminum, 8 wt. % of vanadium, 6 wt. % of chromium, 4 wt. % of molybdenum and 4 wt. % of zirconium), a Ti-11.5Mo-6Zr-4.5Sn alloy (titanium alloy containing 11.5 wt. % of molybdenum, 6 wt. % of zirconium and 4.5 wt. % of tin), and a Ti-13V-11Cr-3Al alloy (titanium alloy containing 13 wt. % of vanadium, 11 wt. % of chromium and 3 wt. % of aluminum), after the hot forging at a suitable β temperature range within 700 to 1050° C. as the forging heating temperature, the blade bodies are radiationally cooled, the leading edges including cover on the tip portion of the blades are quenched faster than the blade main body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling, then the blades are heated for aging at 400 to 650° C. For the β titanium alloys, the hot forging and aging treatment temperatures have a preferable temperature range depending to the composition of the β titanium alloy. For the Ti-15V-3Cr-3Al-3Sn alloy, Ti-3Al-8V-6Cr-4Mo-4Zr alloy, and Ti-11.5Mo-6Zr-4.5Sn alloy, and Ti-13V-11Cr-3Al alloy the hot forging temperature and the aging treatment temperature are preferably set at 760 to 925° C. and 500 to 550° C., respectively.

A second production method of this invention is characterized by a step of forming titanium alloy turbine blades by hot forging or machining, a step of the solid solution treatment of the formed blades, a step of cooling the leading edges including cover on the tip portions of the turbine blades faster than the blade bodies after the solid solution treatment, and a step of heat treating the cooled turbine blades. The leading edges including cover on the tip portions of the blades fall in the same range as those in the first production method of the invention.

In the cooling step after the high-temperature heating for the solid solution treatment after forming the turbine blade shape body by the hot forging of the titanium alloy or by machining a round rod or a square rod without employing the hot forging, the leading edges including cover on the tip portion of the blades, which are eroded, are cooled faster than the blade bodies, then the blades are heat treated for annealing or aging, thereby enabling to obtain a production method which is economical, does not deteriorate reliability of the blades, and prevents erosion.

In this case, the same step as the first production method of this invention can be applied to the turbine blades made of the above α+β titanium alloy, near β titanium alloy or β titanium alloy. Specifically, for the α+β titanium alloy turbine blades, they are produced by hot forging at an α+β temperature or machining, then to heat at an α+β temperature range 10° C. or more lower than the beta transus temperature and to cool, the leading edges including cover on the tip portion of the blades are cooled faster than the blade bodies, then as a heat treatment for annealing or aging the blades, at least one step of heat treatment selected from a group of a step of heating continuously at one temperature between 450 and 850° C. for a suitable time interval, a step of heat treating continuously for a suitable time interval with a suitable temperature gradient, a step of heat treating continuously for a suitable time interval combining a plurality of temperatures and a plurality of time intervals, and a step of intermittently repeating one of above described three steps is applied.

More specifically, for the α+β titanium alloy such as a Ti-6Al-4V alloy, after forging or machining, a heating temperature is preferably 930 to 970° C. And in the following cooling, the blade bodies are radiationally cooled, and the leading edges including cover on the tip portion of the blades are quenched by at least one method selected from gas cooling including air by forced-FAN or pressurized, liquid cooling including water or oil or media with quench rates between of those of water and those of oil, and liquid spraying by a mixture of a pressurized liquid and gas so as to be cooled faster than the blade bodies, then the blades (a) are heated and kept at 750 to 850° C. continuously followed by being heated and kept at 450 to 720° C., or (b) are heated and kept at 750 to 850° C. continuously or discretely followed by being heated and kept at 450 to 720° C., or (c) are heated and kept at 450 to 600° C. continuously followed by being heated and kept at 625 to 720° C., or (d) are heated and kept at 450 to 720° C. continuously or discretely followed by being heated and kept at 625 to 720° C., or (e) are heated and kept at 450 to 720° C.

For the turbine blades made of the near β titanium alloy such as a Ti-10V-2Fe-3Al alloy, the turbine blades are formed by hot forging or machining, heated at a suitable α+β temperature range within 730 to 875° C. for the solid solution treatment, the blade bodies are radiationally cooled in the cooling step, and the leading edges including cover on the tip portion of the blades are quenched by at least one method selected from gas cooling including air by forced-FAN or pressurized, liquid cooling including water or oil or media with quench rates between of those of water and those of oil, and liquid spraying by a mixture of a pressurized liquid and gas so as to be cooled faster than the blade bodies, then the blades are heated at 420 to 650° C. or a plurality of temperatures for aging for a suitable time interval.

For the β titanium alloy such as a Ti-15V-3Cr-3Al-3Sn alloy, after forming the turbine blades by hot forging or machining, they are heated at a suitable β temperature range 700 to 1050° C. for the solid solution treatment, the blade bodies are radiationally cooled, and the leading edges including cover on the tip portion of the blades are quenched by at least one method selected from gas cooling including air by forced-FAN or pressurized, liquid cooling including water or oil or media with quench rates between of those of water and those of oil, and liquid spraying by a mixture of a pressurized liquid and gas so as to be cooled faster than the blade bodies, then the blades are heated at 400 to 650° C. for aging.

In the above each production method, the turbine blades are not always required to be completely finished. And the effects of the invention can be attained even when the finished shape has excess metal.

The effects of the present invention are explained in the following.

Erosion of the turbine blades due to the hit by water droplets or sand is considered to include various abrasion mechanisms. For example, in the case of the hit by water droplets, the erosion is said to be under a fatigue failure mechanism due to accumulation of hitting impacts. On the other hand, the erosion due to the hit by hard substances such as sand is said to be under a grinding mechanism due to hard particles as well as the fatigue failure mechanism.

In view of the above, the inventors conducted an erosion test simulating the erosion by water droplets, wherein various materials were attached to the tip portion of the blades rotated at a high speed, and water droplets were sprayed to the tip portion of the blades, thereby reproducing the erosion by water droplets which occurred in the steam turbines. It was found by measuring the erosion resistances of the materials used that when the materials having the same basic composition were used, the harder material had less abrasion due to erosion and was superior in water droplet erosion resistance. To simulate the erosion due to sand, SiO, particles which were a major component in sand were sprayed at a high speed to measure an abrasion level. It was found that the harder material had a smaller abrasion level regardless of the types of materials. Accordingly, it was found that making the material harder was effective in lowering or preventing the erosion for either mechanism described above.

The mechanical strength of a titanium alloy such as hardness is varied by the heat treatment. And a cooling speed from the high solid solution treatment temperature is a significant factor in determining the mechanical property. To make the titanium alloy harder, it is effective to make larger the cooling speed from the solid solution treatment temperature, to make the microstructure fine, and to harden by the following aging treatment. And, when the turbine blades are produced by hot forging, the heating temperature for the final hot forging has the same role as the solid solution treatment, so that quenching from the high-temperature state after the hot forging is effective to make the alloy harder. The faster the cooling speed is increased, the harder the hardness can be enhanced. Suitable cooling methods include a gas cooling including air by forced-FAN or pressurized, liquid cooling including water or oil or media with quench rates between of those of water and those of oil, and liquid spraying by a mixture of a pressurized liquid and gas.

However, when the cooling speed from the solid solution treatment temperature is increased to enhance the hardness and the tensile strength, ductility and toughness such as a fracture elongation, impact value and fracture toughness are decreased, resulting in lowering resistance against fracture. For the turbine blades, hardness and tensile strength are required to be higher, but ductility and toughness are also required to be high for the rotor attachments where centrifugal force is high to resist against fracture.

From the view points of the above properties required for the turbine blades, in order to prevent the erosion and to enhance the reliability of the whole blades, the leading edges on the tip portion of the turbine blades where the erosion occurs easily are quenched from the high temperature immediately after the hot forging, or those of the blades which are formed by the hot forging and cooled to room temperature once and those of the blades formed by machining are quenched from the solid solution treatment temperature, then are subjected to the annealing or aging treatment to enhance hardness. On the other hand, the remaining portions of the blades are not quenched but radiationally cooled or gradually cooled to retain ductility and toughness, thereby enabling to secure reliability of the whole turbine blades. This hot forging process includes the hot closed die forging and the coining which is effected to reduce thickness variation and to correct a distorsion or twist of the blades after the closed die forging. And in either process, the inclusion of the quenching from the high temperature immediately after the hot working accomplishes the above objects.

To harden the leading edges including cover on the tip portions of the turbine blades by quenching after the hot forging or from the solid solution treatment temperature and annealing or aging thereafter, each titanium alloy has an optimum temperature condition. Now, optimum conditions for representative types of titanium alloys will be described.

For the α+β titanium alloy represented by Ti-6Al-4V, the hot forging or the solid solution treatment temperature is in view of safety a temperature 10° C. or more lower than the beta transus temperature of each α+β titanium alloy which is a transformation temperature from β to α phase in order to uniformly keep the α+β structure of the entire long turbine blades. Furthermore, a primary α content shall not be contained in a large amount to keep tensile ductility and toughness high, so that an optimum hot forging or solid solution treatment temperature is 10 to 65° C. lower than a beta transus temperature of 4 each α+β alloy, for example 930 to 970° C. for a Ti-6Al-4V alloy. The leading edges including cover on the tip portion of the turbine blades quenched from the above temperature range require the aging treatment to enhance their hardness. Age hardening can be made effectively by heat treating at a temperature as low as possible in a temperature range higher than 450° C.

for several to 10 odd hours. Suitable temperatures for the aging treatment are 450 to 720° C. The age hardening hardly takes place at a temperature higher than the above range and requires a long time exceeding dozens of hours at a lower temperature that is not efficient industrially. But, it is effective to make annealing at an intermediate temperature of 850° C. or below prior to the aging treatment so as not to extremely lower the tensile ductility and toughness. This treatment is preferably kept at 750 to 850° C. for several hours. In order to obtain higher hardness at leading edges including cover on the tip portions of the turbine blades, it is effective to make aging at an lower temperatures of 450 to 600° C. prior to the higher temperature aging treatment between 625 and 720° C. These two-step heat treatments can be performed continuously or discretely from first to second temperatures. The blade bodies excluding the leading edges and cover on the tip portion of the turbine blades which are quenched are cooled relatively slowly, so that they are hardly hardened by the above aging treatment, have their hardness hardly lowered by the annealing at the intermediate temperature, and can retain high ductility and toughness even after the above heat treatments.

To produce turbine blades made of the near β class titanium alloy such as Ti-10V-2Fe-3Al, the final hot forging or solid solution treatment temperature is required to keep an α+β structure, therefore is preferably 10° C. or more lower than the beta transus temperature of each near β titanium alloy, for example 875° C. or below for Ti-5Al-2Sn-4Zr-4Mo-2Cr-1Fe alloy. But, the lower limit is preferably 730° C. because an excessively low temperature decreases the following age hardening level. More preferably, it is in a range of 760 to 850° C. The following aging treatment is preferably to heat and keep at a temperature range of 420 to 650° C. for several to 10 odd hours, and more preferably at 500 to 650° C.

For the β titanium alloy such as Ti-15V-3Cr-3Al-3Sn, the final hot forging or solid solution treatment temperature is preferably 700 to 1050° C. More preferably, it is 700 to 850° C. not so as to make the β grains large. For the aging temperature, hardening by the fine dispersion of α phase within a short period of a several hours requires a temperature of 650° C. or below. But, when the temperature is excessively low, ω phase is precipitated, extremely lowering toughness. To prevent it, the aging treatment is preferably effected at a temperature of 400° C. or more.

The aforementioned conditions are representative conditions for each type of titanium alloy. When the required properties and hardness vary according to the application of the turbine blades, the object of the invention to make the leading edges including cover on the tip portions of the turbine blades harder than the blade bodies can be accomplished even when the above conditions are not satisfied.

BEST MODE FOR CARRYING OUT THE INVENTION

Figure 1:
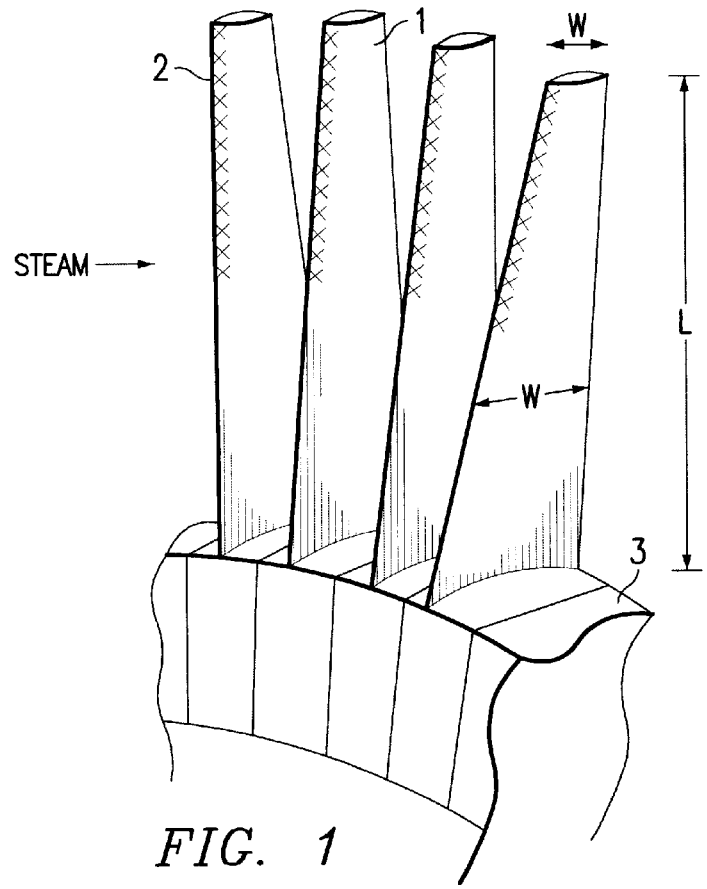
FIG. 1 is a perspective view showing a turbine blade for a steam engine.
Figure 2:
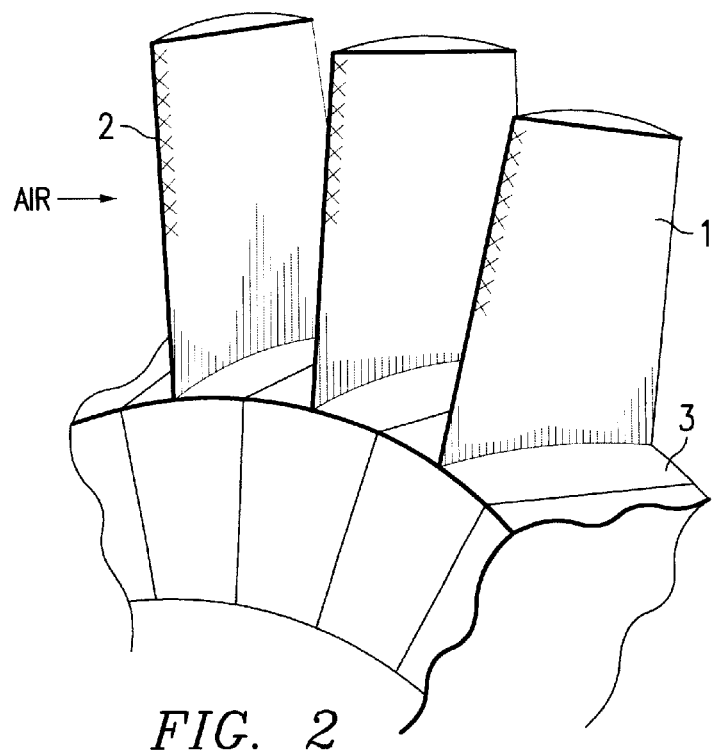
FIG. 2 is a perspective view showing a turbine blade for an aircraft engine.
Figure 3:
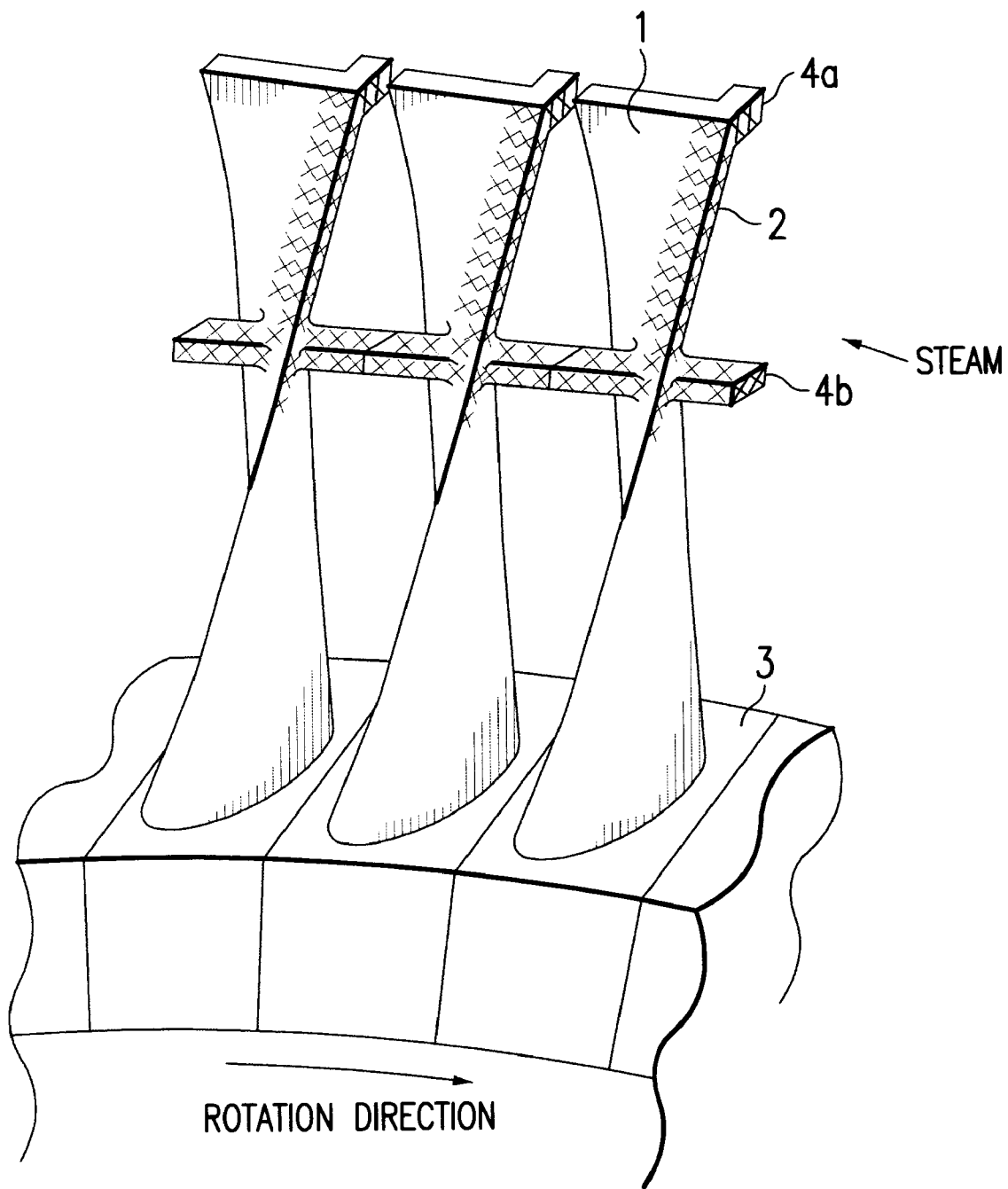
FIG. 3 is a perspective view showing a turbine blade possessing a cover and a snubber.
Figure 4A:
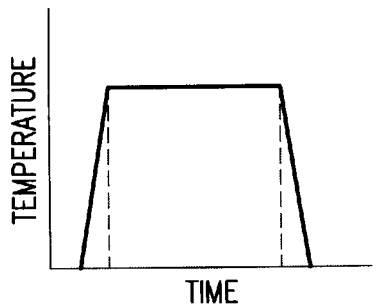
FIG. 4 is a diagram showing schematically concrete examples of heat treatment programs.
Figure 4B:
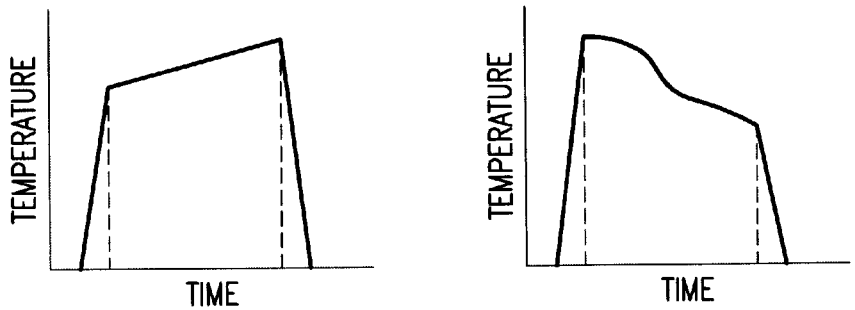
Figure 4C:
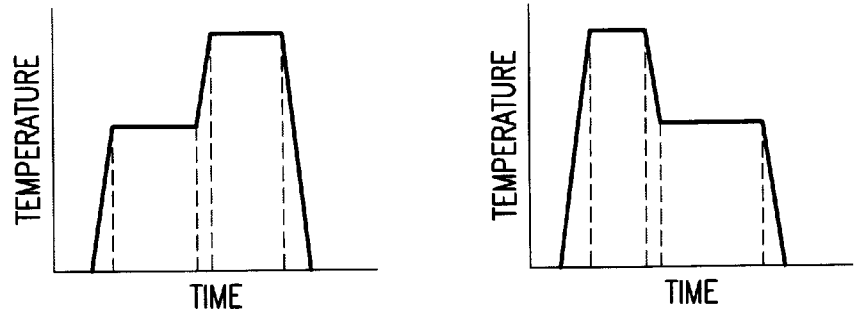
Figure 4D:
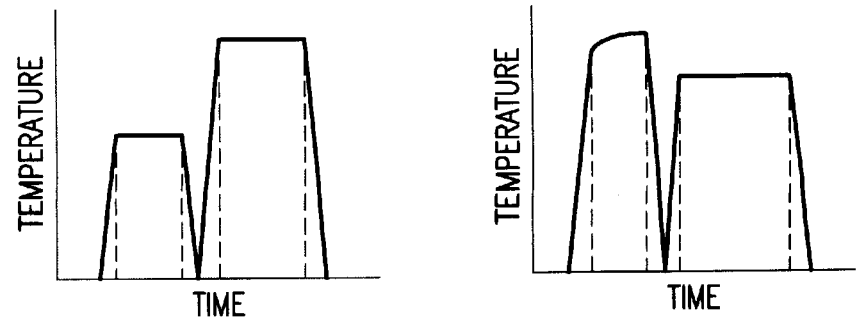

This invention will be specifically described in the following Examples.

EXAMPLE 1

Turbine blades having an airfoil length of 1000 mm were hot forged using a Ti-6Al-4V alloy. The final hot forging was conducted after heating to 950° C. Immediately after that, pressurized water was showered concentratedly on the leading edge sides including cover along 500 mm on the tip portion of the blades to produce a plurality of blades A. And, after the same hot forging, quenching was made by blast air cooling to produce a plurality of blades B. At this time, the remaining parts were covered by the protective cover to avoid the direct water shower or blast air. The quenching after heating at 950° C. was to simulate the final forging of the hot forging or the coining, and either process might be applicable. When the leading edge sides including cover of the tip portions of the blades were quenched to room temperature by the water shower or blast air cooling, it took about five hours for the blade bodies to return to room temperature. Then, a plurality of blades A and some blades of the plurality of blades B were kept at 800° C. for one hour before being cooled and subjected to the aging treatment at 550° C. for six hours (they are called blades A-C). The other hand, some blades of the plurality of blades B were subjected to the aging treatment at 550° C. for six hours before being kept at 675° C. for two hours (they are called blade B-C). Meanwhile, the remaining blades A and B were aged at 600° C. for three hours (they are called blades A-D and blades B-D, respectively). At the same time, a comparative blade 1 by a conventional process was produced by hot forging at the same temperature, gradually cooling, and annealing at 700° C. for two hours.

Test pieces were cut off from the leading edges on the tip portion and the rotor attachments of the blades and tested for hardness. And the test pieces from the rotor attachments were subjected to tensile and Charpy impact tests, and those from the leading edges on the tip portions of the blades were subjected to a water droplet erosion test. Here, the rotor attachment portion is selected as a representative of a part of a blade body. The hardness test was conducted according to the method of Vickers hardness test of JIS Z 2244, the tensile test was conducted according to the method of tensile test of JIS Z 2241 using No. 14A tensile test pieces of JIS Z 2201, and the Charpy impact test was conducted using JIS No. 4 2-mm V-notch Charpy test pieces at 20° C. In the water droplet erosion test, the test pieces were attached to the leading ends of small rotation blades and rotated at a peripheral speed of 300 m/s, and water droplets were sprayed to the test pieces for one hour, then the weight reductions of the test pieces were compared. Table 1 shows the test results.

It is seen from Table 1 that the leading edges on the tip portions of the blades according to the invention have higher tensile strength and hardness values than those of the rotor attachments and are harder than the blade bodies as compared with the comparative blade 1. But, the rotor attachments have the same tensile strength and impact values as the comparative blade 1 and are superior in toughness. The test pieces cut off from the leading edges on the tip portions of the blades undergone the water droplet erosion test have the erosion ratio extensively lowered in proportion to the hardness thereof as compared with the same section of the comparative blade 1. And it is seen that the water droplet erosion level can be decreased down to about 40% or below of the comparative blade according to any method of the present invention. This erosion resistance is favorably compared with that of the Co-based alloy stellite, conventionally used for the erosion prevention. Thus, the production method according to this invention can produce blades which have a high erosion resistance at the leading edges on the tip portions of the blades where erosion occurs, high toughness at the other parts of the rotor attachment, and high reliability.

As the α+β titanium alloy, a Ti-6Al-2Sn-4Zr-2Mo-0.1Si alloy or a Ti-6Al-6V-2Sn alloy was treated by the same procedure but not the same temperatures as in Example 1 to produce turbine blades having the same properties as those in Table 1.

TABLE 1

| Blade | | Part | Cooling method after forging | Heat treatment |
|---|---|---|---|---|
| Comparative blade 1 | | Leading edge side of tip portion | Radiational cooling | 700° C. × 2 h →Air cooling |
| | | Rotor attachment | Radiational cooling | |
| Blade of the present invention | A-C | Leading edge side of tip portion | Water shower cooling | 800° C. 1 h →Air cooling + 550° C. × 6 h →Air cooling |
| | | Rotor attachment | Radiational cooling | |
| | B-C | Leading edge side of tip portion | Blast air cooling | 550° C. × 6 h + 675° C. × 2 h →Air cooling |
| | | Rotor attachment | Radiational cooling | |
| | A-D | Leading edge side of tip portion | Water shower cooling | 600° C. × 3 h →Air cooling |
| | | Rotor attachment | Radiational cooling | |
| | B-D | Leading edge side of tip portion | Blast air cooling | 600° C. 3 h →Air cooling |
| | | Rotor attachment | Radiational cooling | |

| Blade | | Part | Weight loss ratio by water droplet erosion | Tensile strength (M Pa) | Hardness (HV) | Charpy impact value (J/cm$^2$) |
|---|---|---|---|---|---|---|
| Comparative blade 1 | | Leading edge side of tip portion | 1 | 1015 | 320 | — |
| | | Rotor attachment | — | 970 | 310 | 34 |
| Blade of the present invention | A-C | Leading edge side of tip portion | 0.38 | 1150 | 350 | — |
| | | Rotor attachment | — | 1010 | 308 | 38 |
| | B-C | Leading edge side of tip portion | 0.30 | 1190 | 370 | — |
| | | Rotor attachment | — | 985 | 305 | 34 |
| | A-D | Leading edge side of tip portion | 0.35 | 1175 | 358 | — |
| | | Rotor attachment | — | 1010 | 312 | 35 |
| | B-D | Leading edge side of tip portion | 0.33 | 1180 | 360 | — |
| | | Rotor attachment | — | 985 | 309 | 36 |

EXAMPLE 2

Turbine blades having an airfoil length of 1000 mm were hot forged using a Ti-6Al-4V alloy and cooled to room temperature. Then, as the solid solution treatment, the turbine blades were kept and heated at 950° C. for one hour, the leading edge sides along 500 mm on the tip portion of the blade were cooled with water to produce a plurality of blades E, and a plurality of blades F were produced by quenching by the blast air cooling. The water cooling of the leading edges on the tip portion only was conducted by dipping the applicable part of the blades in water. And, for the blast air cooling, the remaining parts were covered by a protective cover to avoid a direct blast air. After the leading edges on the tip portion of the blades were quenched to room temperature by the water or blast air cooling, it took about five hours for the blade bodies to return to room temperature. Then, some blades of the blades E and the blades F were kept at 800° C. for one hour, then aged at 550° C. for six hours (they are called blades E-C). The other hand, some blades were subjected to the aging treatment at 550° C. for six hours before being kept at 675° C. for two hours (they are called blade F-C). Meanwhile, the remaining blades E and F were aged at 600° C. for three hours (they are called blades E-D, F-D respectively). At the same time, the hot forged blades were gradually cooled, kept and heated at 950° C. for one hour as the solid solution treatment, radiationally cooled before being annealed by keeping at 700° C. for two hour to produce a comparative blade 2 according to an ordinary process.

Test pieces were cut off from the leading edges on the tip portions and the rotor attachments of the blades and subjected to the hardness test, Charpy impact test, and water droplet erosion test under the same conditions as in Example 1. Table 2 shows the results.

It is seen from Table 2 that the leading edges on the tip portions of the blades according to the invention have higher tensile strength and hardness values than those of the rotor attachments and are harder than the blade bodies as compared with the comparative blade 2. But, the rotor attachments have the same tensile strength and impact values as the comparative blade and are excellent in toughness. The test pieces cut off from the leading edges on the tip portions of the blades undergone the water droplet erosion test have the erosion ratio extensively lowered in proportion to the hardness thereof as compared with the same section of the comparative blade 2. And it is seen that the water droplet erosion level can be remarkably decreased down to about 40% or below of the comparative blade according to any method of the present invention. This erosion resistance is favorably compared with that of the Co-based alloy stellite, conventionally used for the erosion prevention. Thus, the production method according to this invention, which is applied after the hot forging of the blades, can produce blades which have an high erosion resistance at the leading edges on the tip portions of the blades where erosion occurs, high toughness at the other parts of the rotor attachment, and high reliability.

Example 2 was conducted on the blades produced by hot forging and cooling down. But conducting the same procedure as of Example 2 on the blades produced by machining of wrought Ti-6Al-4V bar resulted in the same effects as those shown in Table 2.

TABLE 2

| Blade | | Part | Solid solution treatment and cooling method thereafter | Annealing and aging treatment |
|---|---|---|---|---|
| Comparative Blade 2 | | Leading edge side of tip portion | 950° C. × 1 h→ Radiational cooling | 700° C. × 2 h →Air cooling |
| | | Rotor attachment | Radiational cooling | |
| Blade of the present invention | E-C | Leading edge side of tip portion | 950° C. × 1 h→ Water cooling | 800° C. × 1 h →Air cooling + 500° C. × 6 h →Air cooling |
| | | Rotor attachment | Radiational cooling | |
| | F-C | Leading edge side of tip portion | 950° C. × 1 h→ Blast air cooling | 550° C. × 6 h + 675° C. × 2 h →Air cooling |
| | | Rotor attachment | Radiational cooling | |
| | E-D | Leading edge side of tip portion | 950° C. × 1 h→ Water cooling | 600° C. × 3 h →Air cooling |
| | | Rotor attachment | Radiational cooling | |
| | F-D | Leading edge side of tip portion | 950° C. × 1 h→ Blast air cooling | 600° C. × 3 h →Air cooling |
| | | Rotor attachment | Radiational cooling | |

| Blade | | Part | Weight loss ratio by water droplet erosion | Tensile strength (M Pa) | Hardness (HV) | Charpy impact value (J/cm$^2$) |
|---|---|---|---|---|---|---|
| Comparative blade 2 | | Leading edge side of tip portion | 1 | 1015 | 320 | — |
| | | Rotor attachment | — | 970 | 310 | 34 |
| Blade of the present invention | E-C | Leading edge side of tip portion | 0.37 | 1165 | 350 | — |
| | | Rotor attachment | — | 1060 | 312 | 38 |
| | F-C | Leading edge side of tip portion | 0.30 | 1195 | 365 | — |
| | | Rotor attachment | — | 998 | 312 | 37 |
| | E-D | Leading edge side of tip portion | 0.31 | 1180 | 357 | — |
| | | Rotor attachment | — | 988 | 309 | 34 |
| | B-D | Leading edge side of tip portion | 0.33 | 1170 | 355 | — |
| | | Rotor attachment | — | 1005 | 311 | 33 |

EXAMPLE 3

Turbine blades having an airfoil length of 850 mm were hot forged using a Ti-10V-2Fe-3Al alloy which is one of the near β titanium alloys. The final hot forging was effected after heating to 785° C., and immediately after that, the leading edge sides along 300 mm on the tip portion of the blades was oil-cooled to produce a plurality of blades G. And, after the same hot forging, a plurality of blades H were produced by quenching by the blast air cooling. The oil cooling of the leading edges on the tip portions only was conducted by dipping the applicable part of the blades in oil. And, for the blast air cooling, the remaining parts were covered by a protective cover to avoid a direct blast air. When the leading edges on the tip portions of the blades were quenched to room temperature by the oil or blast air cooling, it took about five hours for the blade bodies to return to room temperature. Then, some blades of the blades G and H were aged at 600° C. for six hours (they are called blades G-1, H-1, respectively). Meanwhile, the remaining blades G and H were aged at 500° C. for ten hours (they are called blades G-2, H-2, respectively). At the same time, the blades hot-forged at the same temperature were radiationally cooled before being aged by keeping at 550° C. for eight hours to produce a comparative blade 3 according to a conventional process.

Test pieces were cut off from the leading edges on the tip portions and the rotor attachments of the blades and subjected to the hardness test, Charpy impact test, and water droplet erosion test under the same conditions as in Example 1. Table 3 shows the results.

It is seen from Table 3 that the leading edges on the tip portions of the blades according to the invention have higher tensile strength and hardness values than those of the rotor attachments and are harder than the blade bodies as compared with the comparative blade 3. But, the rotor attachments have the same tensile strength and impact values as the comparative blade 3 and are superior in toughness. The test pieces cut off from the leading edges on the front ends of the blades undergone the water droplet erosion test have the erosion ratio extensively lowered in proportion to the hardness thereof as compared with the same section of the comparative blade 3. And it is seen that the water droplet erosion level, according to any method of the present invention, can be remarkably decreased down to about 30% or below of the comparative blade 3. This erosion resistance is favorably compared with that of the Co-based alloy stellite, conventionally used for the erosion prevention. Thus, the production method according to this invention can produce blades which have an high erosion resistance at the leading edges on the tip portions of the blades where erosion occurs, high toughness at the other parts of the rotor attachment, and high reliability.

TABLE 3

| Blade | | Part | Cooling method after forging | Heat treatment |
|---|---|---|---|---|
| Comparative blade 3 | | Leading edge side of tip portion | Radiational cooling | 550° C. × 8 h →Air cooling |
| | | Rotor attachment | Radiational cooling | |
| Blade of the present | G-1 | Leading edge side of tip portion | Oil cooling | 600° C. × 6 h →Air cooling |

TABLE 3-continued

| Blade | | Part | Rotor attachment | Radiational cooling | |
|---|---|---|---|---|---|
| invention | H-1 | Leading edge side of tip portion | Blast air cooling | 600° C. × 6 h →Air cooling | |
| | | Rotor attachment | Radiational cooling | | |
| | G-2 | Leading edge side of tip portion | Oil cooling | 500° C. × 10 h →Air cooling | |
| | | Rotor attachment | Radiational cooling | | |
| | H-2 | Leading edge side of tip portion | Blast air cooling | 500° C. × 10 h →Air cooling | |
| | | Rotor attachment | Radiational cooling | | |

| Blade | | Part | Weight loss ratio by water droplet erosion | Tensile strength (M Pa) | Hardness (HV) | Charpy impact value (J/cm²) |
|---|---|---|---|---|---|---|
| Comparative blade 3 | | Leading edge side of tip portion | 1 | 1170 | 345 | — |
| | | Rotor attachment | — | 1120 | 340 | 18 |
| Blade of the present invention | G-1 | Leading edge side of tip portion | 0.36 | 1290 | 365 | — |
| | | Rotor attachment | — | 1090 | 334 | 23 |
| | H-1 | Leading edge side of tip portion | 0.38 | 1280 | 361 | — |
| | | Rotor attachment | — | 1100 | 330 | 17 |
| | G-2 | Leading edge side of tip portion | 0.33 | 1350 | 375 | — |
| | | Rotor attachment | — | 1010 | 335 | 19 |
| | H-2 | Leading edge side of tip portion | 0.35 | 1310 | 368 | — |
| | | Rotor attachment | — | 1112 | 337 | 18 |

EXAMPLE 4

A plurality of turbine blades having an airfoil length of 600 mm were produced by machining rolled bars of a Ti-10V-2Fe-3Al alloy which is one of the near β titanium alloys. Then, some of the blades were kept and heated at 760° C. for one hour as the solid solution treatment, the leading edge sides along 200 mm on the tip portion of the blades was oil-cooled, and the remaining parts were radiationally cooled to produce blades I. The oil cooling of the leading edges on the tip portions only was conducted by dipping the applicable part of the blades in oil. After the leading edges on the tip portions of the blades were quenched to room temperature by the oil cooling, it took about five hours for the blade bodies to return to room temperature. Then, some blades of the blades I were aged at 600° C. for six hours. And, the remaining blades were wholly cooled radiationally after the above solid solution treatment and aged under the same conditions as above to produce comparative blades 4.

Test pieces were cut off from the leading edges on the tip portions and the rotor attachments of the blades and subjected to the hardness test, Charpy impact test, and water droplet erosion test under the same conditions as in Example

TABLE 4

| Blade | Part | Solid solution treatment and cooling method thereafter | Annealing and aging treatment |
|---|---|---|---|
| Comparative blade 4 | Leading edge side of tip portion | 760° C. × 1 h → radiational cooling | 600° C. × 6 h Air cooling |
| | Rotor attachment | radiational cooling | |
| Blade 1 of the present invention | Leading edge side of tip portion | 760° C. × 1 h → oil cooling | 600° C. × 6 h Air cooling |
| | Rotor attachment | radiational cooling | |

| Blade | Part | Weight loss by water droplet erosion | Tensile strength (M Pa) | Hardness (HV) | Charpy impact value (J/cm²) |
|---|---|---|---|---|---|
| Comparative blade 4 | Leading edge side of tip portion | 1 | 1110 | 338 | — |
| | Rotor attachment | — | 1085 | 330 | 20 |
| Blade 1 of the present invention | Leading edge side of tip portion | 0.29 | 1365 | 370 | — |
| | Rotor attachment | — | 1060 | 328 | 21 |

It is seen from Table 4 that the leading edges on the tip portions of the blades according to the invention have higher tensile strength and hardness values than those of the rotor attachments and are harder than the blade bodies as compared with the comparative blade 4. But, the rotor attachments have the same tensile strength and impact values as the comparative blade 4 and are superior in toughness. The test pieces cut off from the leading edges on the tip portions of the blades undergone the water droplet erosion test have the erosion ratio extensively lowered in proportion to the hardness thereof as compared with the same section of the comparative blade 4. And it is seen that the water droplet erosion level can be remarkably decreased down to about 30% or below of the comparative blade according to any method of the present invention. This erosion resistance is favorably compared with that of the Co-based alloy, stellite, conventionally used for the erosion prevention. Thus, the production method according to this invention can produce blades which have an high erosion resistance at the leading edges on the tip portions of the blades where erosion occurs, high toughness at the other parts of the rotor attachment, and high reliability.

Example 4 was conducted on the blades produced by the machining. And conducting the same procedure as Example 4 for the blades produced by final hot forging a Ti-10V-2Fe-3Al alloy and cooling to room temperature resulted in the same results as in Table 4.

Furthermore, conducting the same procedures but not the same temperatures as Examples 3 and 4 using a Ti-5Al-4Cr- 4Mo-2Sn-2Zr alloy or a Ti-5Al-2Sn-4Zr-4Mo-2Cr-1Fe alloy which is one of the near β titanium alloys resulted in producing turbine blades having the same properties as those shown in Tables 3 and 4.

EXAMPLE 5

A plurality of turbine blades J having an airfoil length of 600 mm were produced by machining rolled rods of a Ti-15V-3Cr-3Al-3Sn alloy which is one of the β titanium alloys. Then, some of the blades were kept at 785° C. for one hour as the solid solution treatment, the leading edge sides along 250 mm on the tip portion of the blades was quenched by pressurized air, and the remaining parts were radiationally cooled to produce blades J. In this case, the remaining parts were covered by a protective cover to avoid a direct pressurized air. After the leading edges on the tip portions of the blades were quenched to room temperature by the pressurized air, it took about five hours for the blade bodies to return to room temperature. Then, the blades J were aged at 480° C. for 16 hours. And, the remaining blades were wholly cooled radiationally after the above solid solution treatment and aged under the same conditions as above to produce comparative blades 5.

On the other hand, the same titanium alloy was heated to 815° C. and finally hot forged to produce turbine blades K having the same size as above. Then, only the leading edges on the tip portions of the blades were quenched by pressurized air, and the remaining parts were radiationally cooled. After that, aging was conducted at 480° C. for 16 hours.

Test pieces were cut off from the leading edges on the tip portions and the rotor attachment of the blades and subjected to the hardness test, Charpy impact test, and water droplet erosion test under the same conditions as in Example 1. Table 5 shows the results.

It is seen from Table 5 that the leading edges on the tip portions of the blades according to the invention have higher tensile strength and hardness values than those of the rotor attachments and are harder than the blade bodies as compared with the comparative blade 5. But, the rotor attachments have the same tensile strength and impact values as the comparative blade 5 and are superior in toughness. The test pieces cut off from the leading edges on the tip portions of the blades undergone the water droplet erosion test have the erosion ratio extensively lowered in proportion to the hardness thereof as compared with the same section of the comparative blade 5. And it is seen that the water droplet erosion level, according to any method of the present invention, can be remarkably decreased down to about 30% or below of the comparative blade 5. Thus, the production method according to this invention can produce blades which have an high erosion resistance at the leading edges on the tip portions of the blades where erosion occurs, high toughness at the other parts of the rotor attachment, and high reliability.

The production method shown in Example 5 was conducted on the blades produced by machining the turbine blades or the blades being cooled after final hot-forging. But, conducting the same procedures as blade of Example 5 on the turbine blades produced by hot forging, cooling down to room temperature and then solution-treating resulted in the same effects as those shown in Table 5.

As the β titanium alloy, a Ti-3Al-8V-6Cr-4Mo-4Zr alloy, a Ti-11.5Mo-6Zr-4.5Sn alloy, or a Ti-13V-11Cr-3Al alloy was treated by the same procedure but not necessarily the same temperatures as in Example 5 to produce turbine blades having the same properties as those in Table 5.

TABLE 5

| Blade | Part | Solid solution treatment and cooling method thereafter | Annealing and aging treatment |
| --- | --- | --- | --- |
| Comparative blade 5 (machining) | Leading edge side of tip portion | 785° C. × 1 h → radiational cooling | 480° C. × 16 h → Air cooling |
| | Rotor attachment | radiational cooling | |
| Blade of the present invention | J (machining) | Leading edge side of tip portion | 785° C. × 1 h → rapid cooling by pressurized air | 480° C. × 16 h → Air coolfng |
| | Rotor attachment | Radiational cooling | |
| | K (Final hot forging) | Leading edge side of tip portion | 815° C. × 1 h → rapid cooling by pressurized air | 480° C. × 16 h → Air cooling |
| | Rotor attachment | Radiational cooling | |

| Blade | Part | Weight loss by water droplet erosion | Tensile strength (M Pa) | Hardness (HV) | Charpy impact value (J/cm²) |
| --- | --- | --- | --- | --- | --- |
| Comparative blade 5 | Leading edge side of tip portion | 1 | 1115 | 325 | — |
| | Rotor attachment | — | 970 | 312 | 21 |
| Blade of the present invention | J (machining) Leading edge side of tip portion | 0.28 | 1315 | 375 | — |
| | Rotor attachment | — | 1010 | 320 | 20 |
| | K (Final hot forging) Leading edge side of tip portion | 0.25 | 1355 | 380 | — |
| | Rotor attachment | — | 985 | 315 | 22 |

INDUSTRIAL APPLICABILITY

The method for producing titanium alloy turbine blades according to this invention cools faster than the blade bodies the leading edges on the tip portions of the turbine blades produced by hot forging according to any method of the present invention and heat-treats for annealing and aging to produce the blades, so that the leading edges on the tip portions of the blades which tend to be easily eroded by water droplets and sand when the turbine is being operated have high erosion resistance, and the rotor attachments and other parts of the blades excel in strength, ductility and toughness. Thus, highly reliable titanium alloy turbine blades can be provided.

And, the method for producing titanium alloy turbine blades according to this invention produces the turbine blades by hot forging or machining, subjects the blades to the solid solution treatment, cools the leading edges on the tip portions of the turbine blades faster than the blade bodies, thereafter heat treats for annealing and aging, so that the titanium alloy turbine blades which excel in erosion resistance, are economical and highly reliable can be produced as same as the producing method above described.

In addition, the titanium alloy turbine blades of the present invention are excellent in erosion resistance of the leading edges on the tip portions of the turbine blades compared with the turbine blade body and superior in long term reliability.

What is claimed is:

1. A method for producing titanium alloy turbine blades comprising a step of forming titanium alloy turbine blades by hot forging, a step of cooling the leading edges including cover on the tip portions of the turbine blades formed by the hot forging faster than the blade main bodies, and a step of heat treating the cooled turbine blades.

2. The method for producing titanium alloy turbine blades as set forth in claim 1;

wherein, the titanium alloy comprises an α+β titanium alloy;

the hot forging step is conducted in an α+β temperature range 10° C. or more lower than a beta transus temperature of the α+β titanium alloy;

the cooling step is a step for quenching the leading edges including cover on the tip portions of the blades faster than the blade main body according to at least one step selected from forced-FAN cooling including gas, forced cooling including pressurized gas, forced cooling including liquid such as water or oil or media with quench rates between of those of water and those of oil, and forced cooling including a mixture of liquid and gas which forms a spraying or fog like state under pressure while cooling the blade main body by radiational cooling; and the heat treating step heat-treats the turbine blades at least according to one step selected from heating at one temperature in the range of 450 to 850° C. for a suitable time period, heating with a suitable temperature gradient for a suitable time period, heating combining a plurality of temperatures and a plurality of time periods for a suitable time period, and heating by repeating at least one step of the above three steps continuously or discretely.

3. The method for producing titanium alloy turbine blades as set forth in claim 1;

wherein, the titanium alloy comprises an α+β titanium alloy;

the hot forging step is a step for forming the turbine blades by heating to the α+β temperature range below 930° C. or below 970° C. which is 10° C. or more lower than the respective beta transus temperature of the α+β titanium alloy;

the cooling step is a step for quenching the leading edges including cover on the tip portions of the blades faster than the blade main body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step is a step for heat treating the turbine blades for a suitable time period according to any one heat treatment selected from a group of (a) heating at 750 to 850° C. continuously followed by heating and keeping at 450 to 720° C., (b) heating at 750 to 850° C. continuously or discretely followed by heating and keeping at 450 to 720° C., (c) heating at 450 to 600° C. continuously followed by heating and keeping at 625 to 720° C., (d) heating at 450 to 600° C. continuously or discretely followed by heating and keeping at 625 to 720° C., or (e) solely heating and keeping at 450 to 720° C.

4. The method for producing titanium alloy turbine blades as set forth in claim 1;

wherein, the titanium alloy comprises a near β titanium alloy;

the hot forging step is a step for forming the turbine blades by heating to 730 to 875° C. which is 10° C. or more lower than a beta transus temperature of each near β titanium alloy;

the cooling step is a step for quenching the leading edges including cove on the tip portions of the blades faster than the blade body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step is a heat treating step for heating and keeping the turbine blades solely at 420 to 650° C. or a plurality of temperatures for a suitable time period.

5. The method for producing titanium alloy turbine blades as set forth in claim 1;

wherein, the titanium alloy comrises a β titanium alloy;

the hot forging step is a step to form said turbine blades by heating to 700 to 1050° C.;

the cooling step is a step for quenching the leading edges including cover on the tip portions of the blades faster than the blade body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step is a step for heating and keeping the turbine blades at 400 to 650° C.

6. A method for producing titanium alloy turbine blades comprising a step of forming titanium alloy turbine blades by hot forging or machining, a step of solid solution treating the turbine blades formed by the hot forging or machining, a step of cooling the leading edges including cover on the tip portions of the turbine blades faster than the blade main bodies after solid solution treatment, and a step of heat treating the cooled turbine blades.

7. The method for producing titanium alloy turbine blades as set forth in claim 6;

wherein, the titanium alloy comprises an α+β titanium alloy;

the solid solution treating step is a step of heating and keeping at a temperature range 10° C. or more lower than a beta transus temperature of the α+β titanium alloy;

the cooling step is a step for quenching the leading edges including cover on the tip portions of the blades faster than the blade body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step heat-treats the turbine blades according to at least one step selected from a group of heating at one temperature in the range of 450 to 850° C. for a suitable time period, heating with a suitable temperature gradient for a suitable time period, heating combining a plurality of temperatures and a plurality of time periods for a suitable time period, and heating by repeating a plurality of times at least one step of the above three steps continuously or discretely.

8. The method for producing titanium alloy turbine blades as set forth in claim 6;

wherein, the titanium alloy comprises an α+β titanium alloy;

the solid solution treating step is a step for heating and keeping the turbine blades at the α+β temperature range below 930° C. or below 970° C. which is 10° C. or more lower than the respective beta transus temperature of the α+β titanium alloy;

the cooling step is a step for quenching the leading edges including cover on the tip portions of the blades faster than the blade body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step is a step for heating and keeping the turbine blades for a suitable time period according to any one heat treatment selected from a group of (a) heating at 750 to 850° C. continuously followed by heating and keeping at 450 to 720° C., (b) heating at 750 to 850° C. continuously or discretely followed by heating and keeping at 450 to 720° C., (c) heating at 450 to 600° C. continuously followed by heating and keeping at 625 to 720° C., (d) heating at 450 to 600° C. continuously or discretely followed by heating and keeping at 625 to 720° C., or (e) solely heating and keeping at 450 to 720° C.

9. The method for producing titanium alloy turbine blades as set forth in claim 6;

wherein, the titanium alloy comprises a near β titanium alloy;

the solid solution treating step is a step for heating and keeping the turbine blades at 730 to 875° C. which is 10° C. or more lower than a beta transus temperature of the near β titanium alloy;

the cooling step is a step for quenching the leading edges including cover on the tip portions of the blades faster than the blade body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step is a step for heating and keeping the turbine blades solely at 420 to 650° C. or a plurality of temperatures for a suitable time period.

10. The method for producing titanium alloy turbine blades as set forth in claim 6;

wherein, the titanium alloy comprises a β titanium alloy;

the solid solution treating step is a step for heating and keeping the turbine blades at 700 to 1050° C.;

the cooling step is a step for quenching the leading edges including cover on the tip portions of the blades faster than the blade body according to at least one step selected from forced-FAN cooling including gas, forced cooling including pressurized gas, forced cooling including liquid such as water or oil or media with quench rates between of those of water and those of oil, and forced cooling including a mixture of liquid and gas forming a spraying or fog like state under pressure while cooling the blade body by radiational cooling; and the heat treating step is a step for heating and keeping the turbine blades at the temperature of 400 to 650° C.

11. The method for producing titanium alloy turbine blades as set forth in claim 3 or claim 8;

wherein, the α+β titanium alloy is a Ti-6Al-4V alloy, a Ti-6Al-2Sn-4Zr-2Mo-0.1Si alloy, or a Ti-6Al-6V-2Sn alloy.

12. The method for producing titanium alloy turbine blades as set forth in claim 4 or claim 9;

wherein, the near β titanium alloy is a Ti-10V-2Fe-3Al alloy or a Ti-5Al-4Cr-4Mo-2Sn-2Zr alloy or a Ti-5Al-2Sn-4Zr-4Mo-2Cr-1Fe alloy.

13. The method for producing titanium alloy turbine blades as set forth in claim 5 or claim 10;

wherein, the β titanium alloy is a Ti-15V-3Cr-3Al-3Sn alloy, a Ti-3Al-8V-6Cr-4Mo-4Zr alloy, a Ti-11.5Mo-6Zr-4.5Sn alloy, or a Ti-13V-11Cr-3Al alloy.

14. Titanium alloy turbine blades in which leading edges including covers on tip portions of the turbine blades are composed of the identical titanium alloy with the turbine blade main body, the leading edges including covers on the tip portions of the turbine blades being superior in erosion resistance to the titanium alloy turbine blades body.

15. Titanium alloy turbine blades in which leading edges including covers on tip portions of turbine blades are composed of the identical titanium alloy with the turbine blade main body, the leading edges including covers on the tip portions of the turbine blades being superior in erosion resistance to the titanium alloy turbine blade main body, wherein the method producing thereof are featured in comprising the steps of forming the turbine blades by hot forging or machining, cooling the leading edges including covers on the tip portions of the turbine blades formed by the hot forging or machining faster than the turbine blade main body after the final hot forging or solid solution treatment, and heating the cooled turbine blades.

* * * * *